United States Patent
Abzarian et al.

(10) Patent No.: US 8,341,723 B2
(45) Date of Patent: Dec. 25, 2012

(54) FILTERING KERNEL-MODE NETWORK COMMUNICATIONS

(75) Inventors: David Abzarian, Kirkland, WA (US);
Salahuddin Khan, Redmond, WA (US);
Eran Yariv, Redmond, WA (US);
Gerardo Diaz Cuellar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1332 days.

(21) Appl. No.: 11/823,861

(22) Filed: Jun. 28, 2007

(65) Prior Publication Data
US 2009/0006847 A1   Jan. 1, 2009

(51) Int. Cl.
*H04L 29/06* (2006.01)

(52) U.S. Cl. ........... 726/13; 713/164; 726/1; 726/22

(58) Field of Classification Search .............. None
See application file for complete search history.

(56) References Cited

U.S. PATENT DOCUMENTS

| | | | |
|---|---|---|---|
| 6,233,618 B1 | 5/2001 | Shannon | |
| 6,334,056 B1 | 12/2001 | Holmes et al. | |
| 7,284,267 B1 | 10/2007 | McArdle et al. | |
| 7,841,006 B2 * | 11/2010 | Gassoway | 726/23 |
| 2004/0006706 A1 * | 1/2004 | Erlingsson | 713/200 |
| 2004/0243707 A1 | 12/2004 | Watkinson | |
| 2004/0250131 A1 * | 12/2004 | Swander et al. | 713/201 |
| 2005/0114704 A1 * | 5/2005 | Swander | 713/201 |
| 2005/0125687 A1 | 6/2005 | Townsend et al. | |
| 2005/0160289 A1 | 7/2005 | Shay | |
| 2005/0257245 A1 | 11/2005 | Patrick et al. | |
| 2005/0268331 A1 | 12/2005 | Le et al. | |
| 2006/0195899 A1 | 8/2006 | Ben-Shachar et al. | |
| 2006/0248581 A1 * | 11/2006 | Sundarrajan et al. | 726/12 |
| 2007/0016945 A1 | 1/2007 | Bassett et al. | |
| 2008/0034415 A1 * | 2/2008 | Chacko et al. | 726/14 |
| 2008/0295174 A1 * | 11/2008 | Fahmy et al. | 726/23 |

FOREIGN PATENT DOCUMENTS

WO        WO 02056153 A2    7/2002

OTHER PUBLICATIONS

Sailer et al., "Attestation-based Policy Enforcement for Remote Access," IBM T.J. Watson Research Center, Hawthorne, NY, pp. 308-317, http://delivery.acm.org/10.1145/1040000/1030125/p308-sailer.pdf?key1=1030125&key2=1195857711&coll=GUIDE&dl=GUIDE&CFID=17402171&CFTOKEN=73855055.
Keromytis et al., "The Strongman Architecture," 11 pgs, http://www1.cs.columbia.edu/~angelos/Papers/strongman.pdf.

* cited by examiner

*Primary Examiner* — Benjamin Lanier
(74) *Attorney, Agent, or Firm* — Chin IP, PLLC; David Chin (57) ABSTRACT

Some embodiments of the invention are directed to techniques for determining whether a process on a computer system that is sending or receiving data, or is attempting to send or receive data, with another computer system is executing in kernel mode or user mode and providing an indicator of this determination to a security engine. In some embodiments, such an indication is provided to a security engine (e.g., a firewall) that implements a security policy based at least in part on whether the sending or receiving process is in kernel mode or user mode, and filter communications based on a process' operating mode. This enables a security engine to maintain security policies of greater specificity and thus improve security of a computer system.

20 Claims, 5 Drawing Sheets

FILTERING KERNEL-MODE NETWORK COMMUNICATIONS

BACKGROUND OF INVENTION

Operating systems conventionally permit processes executing on a computer system to operate in one of two operating modes: user mode and kernel mode (also called supervisor mode or monitor mode). Kernel mode is a privileged execution mode in which processes may perform functions such as interacting with hardware that processes executing in user mode are prohibited from performing.

Processes being executed by or on behalf of a user are executed in user mode and may be restricted in their ability to carry out some functions. These restricted functions may be, for example, interacting with hardware such as writing data to a disk. Preventing user processes from executing certain operations averts problems that may occur such as a user misusing hardware (e.g., accidentally formatting a disk or overwriting critical code stored on disk) or two users attempting to use hardware simultaneously (e.g., two users trying to write to a disk at once).

Processes being executed by or on behalf of the operating system are executed in kernel mode. These processes are typically not restricted in their ability to carry out functions, and may interact with hardware or execute any other privileged instructions. User processes may therefore request that the operating system, executing in kernel mode, carry out some functions, such as writing to a disk, though the operating system may also execute operations in kernel mode independent of user mode processes (i.e., execute a function without a corresponding request from a user process).

SUMMARY OF INVENTION

Some embodiments of the invention are directed to techniques for determining whether a process on a computer system that is sending or receiving data, or is attempting to send or receive data, with another computer system is executing in kernel mode or user mode and providing an indicator of this determination to a security engine. In some embodiments, such an indication is provided to a security engine (e.g., a firewall) that implements a security policy based at least in part on whether the sending or receiving process is in kernel mode or user mode, and filter communications based on a process' operating mode. This enables a security engine to maintain security policies of greater specificity and thus improve security of a computer system.

In one embodiment, there is provided at least one computer-readable medium encoded with a plurality of instructions that when executed perform a method in a computer environment. The computer environment comprises a computer network to which the computer system is coupled. The method comprising an act of determining whether a process that is executing on the computer system and attempting to send and/or receive data over the computer network is executing in an operating system kernel mode of the computer system. The method further comprises an act of notifying at least one security engine in the computer environment of the determination made by the act of determining.

In another embodiment, there is provided a method for use in a computer system operating in a computer environment that further comprises a computer network to which the computer system is coupled. The method comprises determining whether a process that is attempting to send and/or receive at least one communication over the computer network is executing in an operating system kernel mode of the computer system. The method further comprises notifying at least one security engine in the computer environment of the determination made in the act of determining. The method further comprises allowing or disallowing the process to perform the operation based on a determination of the security engine.

In a further embodiment, there is provided a computer environment comprising at least one computer system having at least one process executing thereon that attempts to send and/or receive at least one communication over a computer network. The computer system comprises at least one processor programmed to determine whether the at least one process is executing in an operating system kernel mode of the at least one computer system. The computer environment further comprises at least one security engine that establishes at least one security policy that determines at least one filtering function that the at least one security engine performs on at least one communication sent and/or received by the computer system. The at least one security policy employs at least one filtering parameter that is based on a determination of whether a source and/or destination for the at least one communication in the computer system is a process executing in an operating system kernel mode of the computer system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In conventional computer environments, one or more security engines implement one or more security methods that govern a computer system's communications with other computer systems. For example, a firewall may be implemented on a computer system or in a computer network that analyzes communications and relays or blocks the communications based on a firewall policy comprising firewall rules and firewall settings. The firewall policy may stipulate, for example, that all communications from a particular computer system should be blocked, or that only communications on a particular communication port should be relayed.

Applicants have appreciated that such conventional security methods for governing a computer system's interactions with other computer systems have been limited to being applied in the same way to all processes in computer systems, whether systems processes or user processes. For example, conventional firewalls provide no ability to filter based on firewall rules that distinguish between an operating system process and user processes. Thus, when a firewall exception is made to support an operating system process, Applicants have appreciated that a security risk is created in that the exception necessarily then equally applies to user processes, even though the administrator who created the exception would prefer that it not because of a risk that a user process could improperly exploit it. Applicants have therefore appreciated the desirability of implementing security methods that execute security policies for computer systems on computer networks that evaluate in what operating mode (e.g., kernel mode or user mode) the sending and/or receiving process is executing, so that the security methods may achieve a finer granularity of control (e.g., finer granularity in filtering that allows for more effective blocking when the security process is a firewall).

In view of the foregoing, one embodiment of the present invention is directed to a technique for determining whether a sending or receiving process on a computer system is executing in kernel mode and providing that determination to a security process. Another embodiment is directed to a security process that may use information about a sending and/or receiving process' operating mode to determine how to enforce a security policy (e.g., whether to allow/relay or block a particular communication).

Figure 1A:
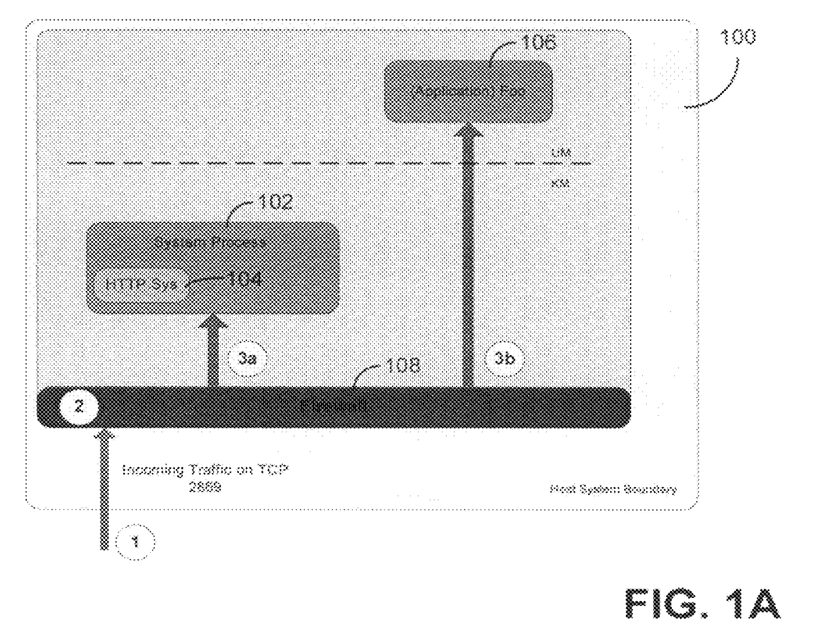
FIG. 1A is a diagram of a conventional computer system and a security engine implemented by the computer system.

FIG. 1A is a diagram of a computer system 100 having a conventional firewall 108. Computer system 100 comprises an operating system process 102 that executes in kernel mode (KM). The OS process 102 executes a Hypertext Transfer Protocol (HTTP) process 104 in kernel mode. Computer system 100 further comprises an application Foo 106 executing in user mode (UM), and a firewall 108 providing security for the computer system 100. In action 1 of the diagram, the computer system 100 receives incoming traffic on Transmission Control Protocol port 2869. The received incoming traffic is a communication from another computer system in a computer network to which computer system 100 is connected.

When the traffic is received by the computer system 100, it is passed to the firewall 108 to determine in action 2 whether the traffic should be relayed to a destination process specified for the communication or whether it should be blocked. This determination is made according to the firewall policy of firewall 108. The firewall policy may comprise at least one firewall rule having parameters related to the type of communication to which the firewall rule applies and what should be done with those communications (e.g., relay or block), as well as any settings related to the firewall (e.g., options such as a temporary "Block all incoming traffic").

According to the conventional firewall executed by the computer system 100, if the received incoming traffic meets the requirements of one or more firewall rules for being relayed to a listening process, the received traffic will be relayed to whatever process is listening without regard to what the process is. Thus, in the example above, even though the firewall exception for TCP port 2869 was created only to enable the system process 102 to receive traffic over that port, if the user process Foo 106 is listening for data on TCP port 2869 when the incoming traffic is received, the firewall 108 will not prevent the traffic from being relayed to the user mode process Foo 106. As such, in actions 3*a* and 3*b* of FIG. 1A, the received traffic may be routed not only to the system process 102, as intended, but also may undesirably be routed to the application Foo 106 if that process was listening on the TCP port 2869 for received data.

Figure 1B:
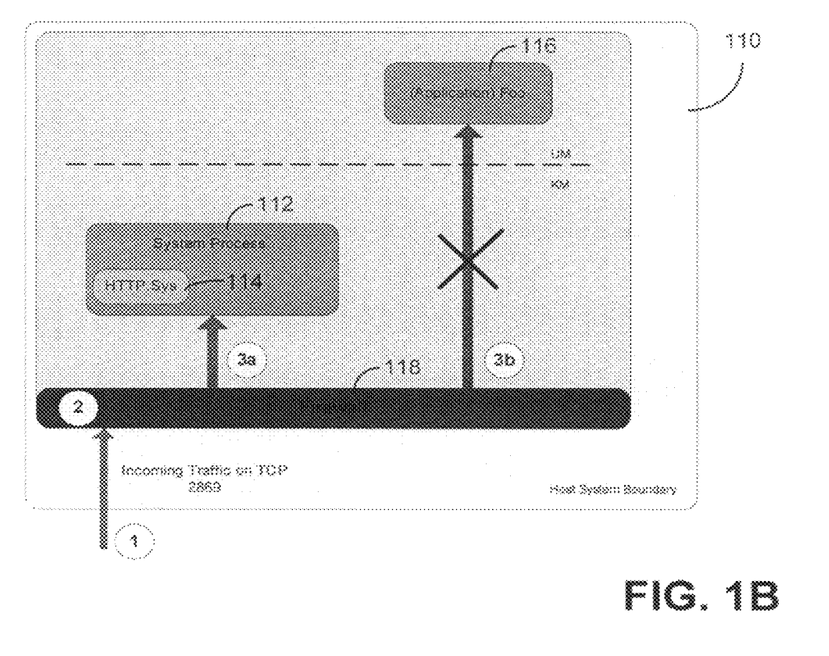
FIG. 1B is a diagram of an exemplary computer system and an exemplary security engine that may filter based on whether a process receiving data is executing in the computer system's operating system's kernel mode in accordance with some embodiments of the invention.

One embodiment of the invention is directed to techniques to close this potential security hole that exists in conventional systems. FIG. 1B is a diagram of a computer system 110 having at least one security method capable of implementing security policies that filter communications depending on whether the source or target for a communications is executing in kernel mode in accordance with one embodiment of the present invention. Computer system 110, similar to computer system 100, comprises an operating system process 112 and an HTTP process 114 executing in kernel mode, as well as an application Foo 116 executing in user mode. As in FIG. 1A, communications (such as data and/or instructions) are received on TCP port 2869 in action 1, passed to the firewall 118, and analyzed by the firewall 118 in action 2. The communications received may be any suitable type of communication from another computer system in a computer network to which computer system 100 is connected. The firewall policy of the firewall 118 in FIG. 1B, however, may have, in addition to any suitable parameters (examples of which are discussed above), a data field for one or more firewall rules and/or firewall settings specifying the process mode for processes to which this rule should apply. For example, a firewall rule such as one for the computer system 110 of FIG. 1B may specify that all inbound traffic received on TCP port 2869 may be relayed only if the process on computer system 110 which is bound to TCP port 2869 is executing in kernel mode. Thus, in action 3*a* the received traffic may be relayed to the system process 102 but will be blocked in action 3*b* if a user mode process associated with application Foo 116 is listening on TCP port 2869 (as indicated by the X). This may prevent any user mode process from receiving secure or sensitive traffic intended for the operating system, may prevent user mode processes from sending traffic on certain ports as if they were the operating system, or may prevent user mode processes from exploiting in any other way any firewall rule intended to be used only by the operating system or any process executing in kernel mode.

It should be appreciated that embodiments of the invention are not limited to employing a firewall that evaluates whether the source or destination process is in kernel or user mode, as other security facilities may evaluate such a parameter in other embodiments of the invention. For example, in one embodiment of the invention, instead of or in addition to a firewall 118 that has one or more firewall rules that filter based on the source or destination process being in kernel or user mode, the computer system 110 may implement a connection security engine such as an Internet Protocol Security (IPsec) engine that regulates security of a connection between computers (by, for example, encryption, authentication, etc.). Additionally, other embodiments of the invention are directed to security methods that are not hosted by the computer system 110 with the target or source process of interest, but may be hosted by a separate computer system in a computer network to which the computer system 110 is connected. For example, a security method that filters based on whether a source and/or destination process is executing in a kernel or user mode may be implemented by a network element such as a router, switch, or hub, by a server, or by any other suitable computing device connected to the computer network.

As discussed above, a security policy implemented by a computer system in accordance with some embodiments of the invention may have a data field in the security policy or in some subset of the security policy (e.g., a particular firewall rule implemented by a security policy) specifying an operating mode that the security policy should apply to or be associated with. For example, for a computer system which has implemented a firewall as part of its security policy, an illustrative format for a firewall rule implemented by the computer system may comprise data fields such as:

```
Action=Allow
Active=TRUE
Dir=In
Protocol=6
LPort=2869
App=System
Name=@firewallapi.dll,-29001
Desc=@firewallapi.dll,-29001
Group=@firewallapi.dll,-29000
```

The data fields shown include any parameters on which the firewall 118 may make its decision to allow or block communications. The ACTION field indicates what the firewall 118 should do if a received communication matches the remainder of the fields (e.g., whether it should be blocked or allowed). A firewall rule may also be enabled or disabled (e.g., by a firewall administrator), and thus the firewall rule may comprise an ACTIVE field storing a "True" or "False" value. The firewall rule may also store a name for itself (the NAME field) and/or a description of its functionality (the DESC field) so that it might be distinguished to a user or administrator. A firewall may also store a GROUP indicator, which may link together two or more firewall rules that relate to a particular experience or feature on the computer system (e.g., an application). In this manner, all firewall rules relating to a particular experience or feature on the computer system may be simultaneously enabled or disabled when referred to as a group, or other suitable group operations may be performed on the firewall rules. The NAME field may take a definite value, or may take an indefinite value such as a reference to a text value in a dynamic linked library, such as shown above. This latter approach may be taken in cases where different text values may be used in different circumstances, such as in different locations where different languages may be used. By referencing the text instead of storing the text directly, the firewall rule may be more readily adapted to implementation in different circumstances. Either technique (definite or indefinite values) may also be employed for the description of the firewall rule (the DESC field) or the GROUP field.

The firewall rule may also comprise one or more filtering parameters. A firewall rule may store an indicator of what type of traffic it applies to, for example, inbound or outbound (i.e., into the computer or computer network protected by the firewall or out of the computer or computer network) (the DIR field). The firewall rule may further comprise an indicator of what protocol or protocols it operates on (the PROTOCOL field), stored in any suitable way such as by the number assigned to the protocol by the Internet Assigned Numbers Authority (IANA) or some other way. For example, the PROTOCOL field may store a value of 6, which corresponds to the Transmission Control Protocol (TCP) in the IANA classification scheme. The local port used by the data may also be regulated by the firewall 118 (the LPORT field). This may be used to limit the type of data being transmitted, because certain types of data tend to be transmitted over certain ports, and may also serve to limit the number of ports open on the computer or computer network. The LPORT field may take any appropriate value (e.g., TCP ports are numbered from 0 to 65535).

The above-described data fields for a firewall rule are provided merely for illustration purposes, as it should be appreciated that the embodiments of the invention related to including a firewall rule field that evaluates whether a source and/or destination process is executing in a kernel or user mode can be used with any firewall rule, and are not limited to a firewall rule having the fields described above.

In accordance with some embodiments of the invention, the firewall rule may store an indicator specifying the operating mode that the sending and/or receiving process to which the firewall rule applies. In the exemplary firewall rule shown above, this indicator is stored in the APP data field. When the firewall rule is being evaluated by the firewall 118, in some embodiments of the invention if the APP data field is set to "System," then the firewall 118 will block the traffic unless the sending and/or receiving process (depending on whether the firewall rule applies to outbound or inbound communications) is executing in kernel mode. If the firewall rule applies to user mode processes, then the APP field may store any suitable indicator of a particular process or application that may exploit the rule (e.g., a file system path for an executable associated with the process or application) or any other suitable value (e.g., "User"). If a firewall rule is implemented which does not filter based on whether the sending and/or receiving process is executing in kernel mode or user mode, then the APP field may be excluded from the firewall rule or may be left blank. It should be appreciated that the field that specifies mode for a process for a communication is not limited to being provided in an APP field or to specifying a "System" value, and that embodiments of the invention may implement in any suitable way firewall rules that filter based on whether the sending and/or receiving process is executing in kernel mode or user mode.

It should be appreciated that embodiments of the invention that relate to a security facility that filters based on whether a source or destination process is executing in kernel mode or user mode are not limited to use in firewalls, and may be employed in any suitable security method or combination of security methods. For example, in one embodiment of the invention, a connection security engine such as an IPsec engine may be implemented having at least one connection security policy that evaluates the operating mode for an application to engage in a connection. Connection security policies may store connection security rules dictating whether a connection should or must be encrypted, authenticated, checked for integrity, and/or any other suitable connection security parameters, and, in one embodiment of the invention, may dictate whether the connection security rule applies to user-mode processes and/or kernel-mode processes. For example, a connection security engine may require different levels of security for kernel and user mode processes. For example, the connection security engine may require a higher level of encryption for more sensitive kernel-mode communications than for user-mode communications, or may require less authentication for kernel-mode processes than for user-mode processes, or any other suitable combination of requirements.

For a security process to filter based on whether a process that is a source and/or destination process is executing in kernel mode, it is desirable to provide a technique for determining whether a source and/or destination process for a communication is executing in kernel mode. This determination can be made in any suitable way, as aspects of the invention are not limited in this regard. Some illustrative techniques are described below, but embodiments of the invention are not limited to implementing any of the exemplary techniques and may implement any suitable technique for determining whether a source and/or destination process is executing in kernel mode. It should be appreciated that the embodiments of the invention that relate to a security process which filters based on whether a source and/or destination process is executing in kernel mode can be used with any suitable technique for determining whether a source and/or destination process is executing in kernel mode.

In addition, some embodiments of the invention are directed to determining whether a source and/or destination process is executing in kernel mode. In one embodiment of the invention, this determination is provided to a security facility to enable filtering. However, the invention is not limited in this respect, and embodiments of the invention may provide this determination to any suitable receiving process for any suitable purpose.

Figure 2:
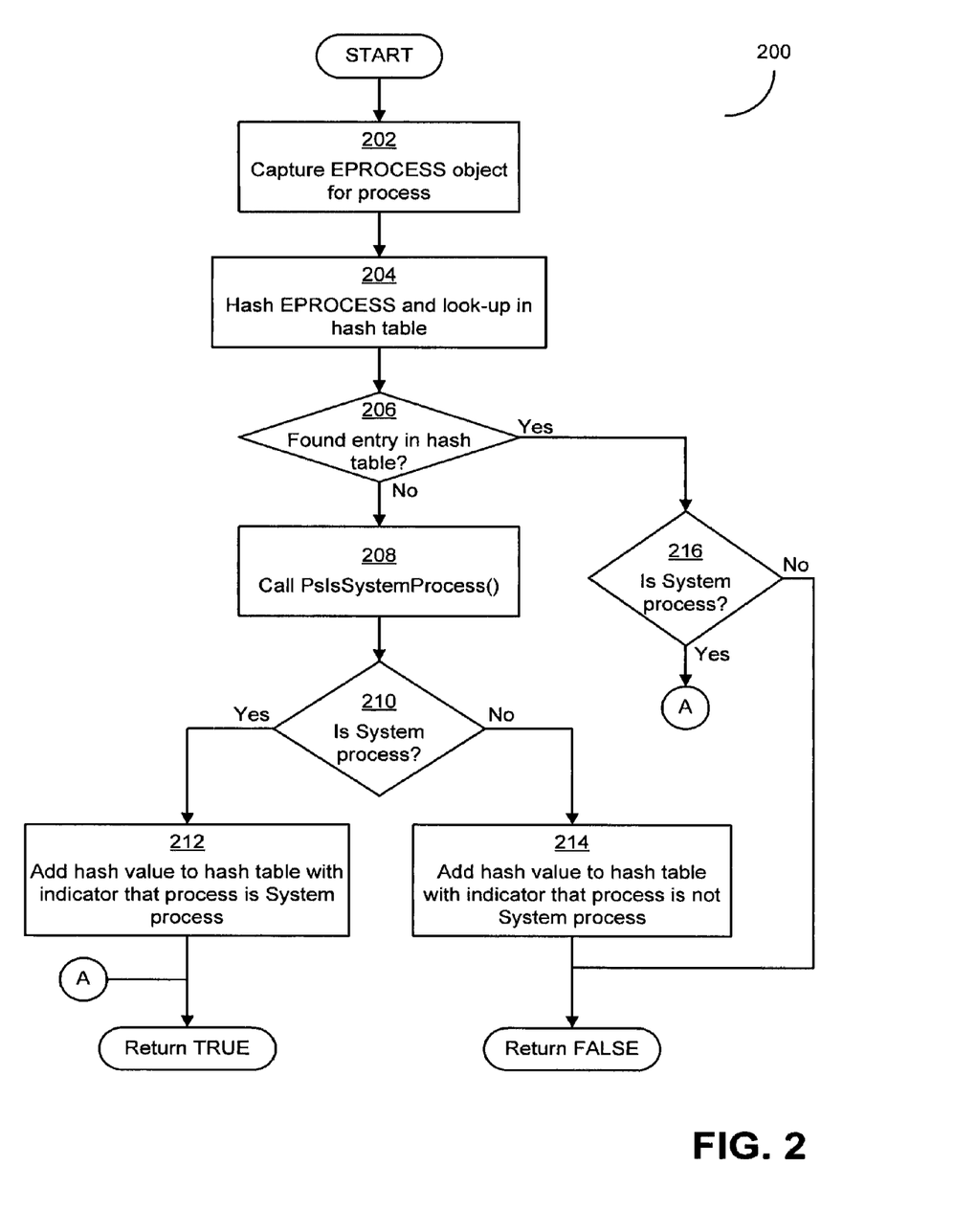
FIG. 2 is a flowchart of an illustrative process for determining whether a sending or receiving process is executing in an operating system's kernel mode in accordance with some embodiments of the invention.

FIG. 2 shows a flowchart of an illustrative determination process for determining whether a sending and/or receiving process is executing in an operating system's kernel mode. When used in connection with a firewall that filters based on whether a receiving process is executing in kernel mode, the process 200 may start when data is received by the firewall, and may determine what process is active on the communication port on which the data was received. The determination process may then examine the receiving process to determine whether it is a kernel-mode process, and may pass that determination to the firewall to evaluate in determining whether to relay the data.

Determining what process is active on the receiving port may be done in any suitable manner, such as by examining information about a communication socket that has been opened by the receiving process on the port. When a process performs socket operations on a socket such as opening and binding to the socket or performs other socket operations on the socket (such as Transmission Control Protocol (TCP) socket operations such as listen, connect, or accept, User Datagram Protocol (UDP) socket operations such as send and receive, or raw socket operations such as putting the socket in promiscuous mode), the computer system on which the process is opening the socket typically collects information about the process such as what the application executing the process is, what user is executing the application, to what port the socket is being bound, and other information.

The process starts in block 202 when a communication is received by the firewall. Information about the receiving socket is used to retrieve the information that the computer system collected about the process that opened the socket (or performed any other suitable socket operation on the socket). The way the information is retrieved may vary depending, for example, on the manner in which the information was collected by the computer system and how the computer system stores the information. In the Microsoft Windows operating system, available from the Microsoft Corporation of Redmond, Wash., the information about a process that performed a socket operation on a socket (e.g., opened the socket) is stored in an operating system object referred to as an EPROCESS object. The EPROCESS object is maintained by the operating system while the process that performed the socket operation is executing and stores information about the process that performed the socket operation. In one embodiment, after a determination is made about whether a process is executing in kernel or user mode, information is stored to save time and processing resources for future communications to and/or from the process. This can be done in any way, as the invention is not limited in this regard. Also, it should be appreciated that the aspects of the invention that determine whether a process is executing in kernel mode or user mode are not limited to storing information after making a determination.

The process of FIG. 2 implements a process that stores information after a determination is made whether a process is executing in kernel mode. Thus, after the process that performed the socket operation is identified in block 202, the determination process proceeds to block 204 to determine whether information is stored about the identified process. This can be done in any suitable way. In the embodiment of FIG. 2, a table of processes is maintained with an indicator for whether a process was previously determined to be executing in kernel mode or user mode. The indicators are maintained alongside a hash value for the EPROCESS object (captured in block 202) as opposed to storing the full EPROCESS object along with the indicator, as the hash value requires less storage space. When the table is stored in this way, in block 204 the EPROCESS object, or any suitable characteristic or component thereof (e.g., a data field of the EPROCESS object or a memory address of the EPROCESS object), is run through a hash function to determine a hash value for the EPROCESS value, and the table may be examined to determine if there is an entry for the hash value. Any suitable hash function can be employed that provides a unique identifier based on a specific input. If in block 206 an entry is found in the hash table for that hash value, then in block 216 the associated indicator is read and it is determined whether the process is executing in kernel mode, in which case the process 200 returns TRUE, or in user mode, in which case the process 200 returns FALSE.

If the hash value is not found in the hash table, however—meaning that the process that performed the socket operation has not previously been examined—then the process proceeds to block 208 to directly determine whether the receiving process is executing in kernel mode. This can be done in any suitable way. In one embodiment shown in FIG. 2, an EPROCESS object for the receiving process examined to determine whether it is a kernel-mode or user-mode process. This may be done in any suitable manner, such as with an operating system function call or otherwise. In the Microsoft Windows operating system, a PsIsSystemProcess( ) function call may be made to determine whether the process identified in the function call is a system process (i.e., executing in kernel mode). If it is determined in block 210, based on the result of block 208, that the process is a kernel-mode process, then the process proceeds to block 212 wherein the hash value is added to the hash table along with an indicator that the process is a kernel-mode process. Such an indicator may be a binary true/false value, a text indicator identifying the process such as "System," or any other suitable value. After the hash table has been updated in block 212, the process 200 returns TRUE, indicating that the process is a kernel-mode process.

If the process is determined not to be a kernel-mode process in block 210, then the process proceeds to block 214 wherein the hash value is added to the hash table along with an indicator that the process is not a kernel-mode process. Again, this indicator may be a binary value, a text value such as the path of the binary executable for the process or the name of the process, or any other suitable value. Once the hash table is updated in block 214, the process 200 returns FALSE, indicating that the process is not a kernel-mode process.

It should be appreciated that embodiments of the invention that are directed to determining whether a source and/or destination process for a communication is executing in kernel mode are not limited to implementing the exemplary process shown in FIG. 2, and that any suitable process for determining whether a process is a kernel-mode process may be implemented.

As mentioned above, the embodiment directed to determining whether a process is executing in kernel mode are not limited to doing so to facilitate a firewall rule evaluation. For example, a process such as process 200 may be implemented when a process attempts to open and bind to a socket or perform socket operations such as those discussed above.

Based on security policies (e.g., firewall rules or IPsec rules), the operating system may examine the process to determine whether it is a kernel-mode process or user-mode process before permitting the process to perform socket operations. In this manner, for example, if the security policy requires that a process be a kernel-mode process to send or receive data on a particular communication port, a user-mode process may be blocked from performing any operations on that port, rather than being blocked when attempting to send or receive data.

As another example, a process such as process 200 may be used to evaluate a process attempting to transmit a communication over a socket to determine whether the transmitting process is permitted to do so based on its operating mode (e.g., kernel or user). Further, embodiments of the invention may implement a process such as process 200 in computer systems implementing security methods different from or in addition to firewalls, such as connection security engines, and evaluate connection security policies based on whether a transmitting and/or receiving process is executing in kernel or user mode.

It should also be appreciated that while the embodiments of FIGS. 1A and 1B are described with respect to filtering based on sockets having particular communication ports over which data is to be sent or received, other embodiments of the invention may evaluate security policies based on any parameters or characteristics of a connection. For example, in one embodiment of the invention, filtering may be performed on a destination and/or originating address of a communication to be sent. As another example, in one embodiment of the invention, filtering may be performed on whether a connection over which data has been or is to be sent or received meets certain connection security levels for encryption, authentication, and/or integrity.

As should be appreciated from the foregoing, embodiments of the invention are directed to implementing in any suitable manner one or more security policies that filter communications based on whether a receiving and/or transmitting process is executing in kernel or user mode. In embodiments of the invention that implement a firewall as a part or whole of the security method for a computer system, firewall rules may be created or managed to filter based on the operating mode in any suitable manner.

For example, a command line interface may be used to create firewall rules that takes as input various parameters used in creating the rule. For example, a command line interface such as     netsh advfirewall firewall set rule name="Rule 1" new App=System may be used. In this example, netsh may be a program that performs multiple functions related to network administration, and takes as input values indicating what particular function should be performed (e.g., "advfirewall firewall set rule" indicates that netsh should use its advanced firewall functionality to configure a firewall rule). The NAME parameter indicates the name of the firewall rule that should be configured, while the "App=System" parameter is the new parameter that should be added to the firewall rule. As discussed above, setting the application field to "System" indicates that the firewall rule only applies to kernel-mode processes (e.g., only kernel-mode processes should be allowed to exploit the firewall rule to send communications), though embodiments of the invention are not limited to implementing any specific indicator in firewall rules. It should be appreciated that embodiments of the invention may not implement a command such as netsh and may instead implement any other suitable command line interface.

Figure 3:
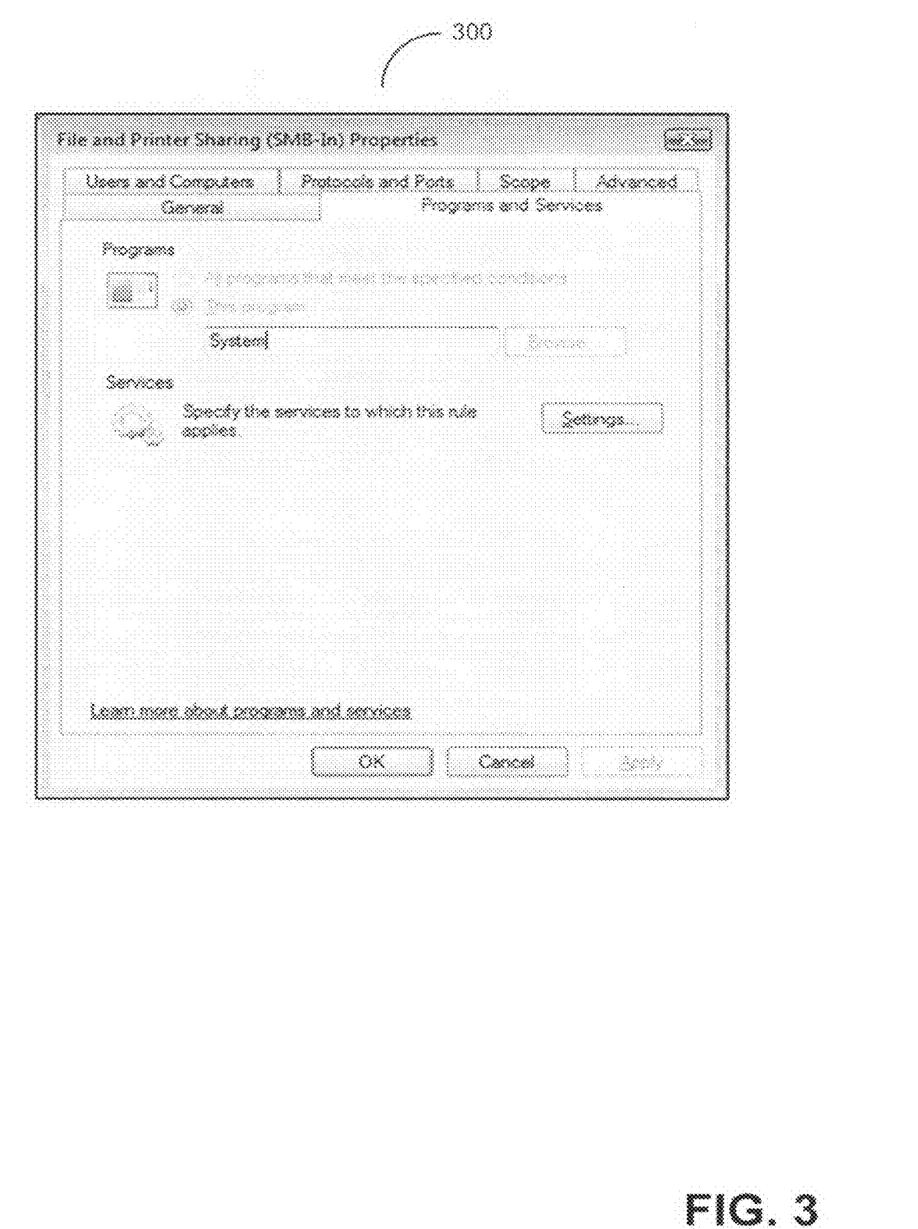
FIG. 3 is an exemplary graphical user interface that may be implemented by some embodiments of the invention.

As an alternative (or in addition to) to the command line interface, any suitable graphical user interface may be used to create or manage firewall rules, such as the one shown in FIG. 3. In the graphical user interface 300, a firewall rule regulating file and printer sharing for a computer system is being edited. Tabs are shown for specifying parameters such as those for users and computers and protocols and ports that may send or receive data. Additionally, in some embodiments of the invention, a tab is provided in the graphical user interface 300 for specifying programs/processes and services that are within the scope of the firewall rule. Similar to the embodiments discussed above, by selecting that only the "System" process meets the requirements of the firewall rule, the firewall rule will only apply to kernel-mode processes and only those processes will be allowed to send or receive data through the firewall (or, depending on the value of the ACTION data field discussed above, only those processes may be blocked by the firewall rule). While the text "System" may be entered into the graphical user interface 300 to indicate that kernel-mode processes are within the scope of the firewall rule, it should be appreciated that embodiments of the invention may implement a graphical user interface accepting any indicator, text or otherwise, that only kernel-mode processes are to be impacted by the firewall rule.

As a further alternative to a command-line interface and a graphical user interface, an Application Programming Interface may be implemented to allow users or applications to set firewall rules specifying that only kernel-mode processes are to be impacted by the firewall rule. For example, a firewall rule API may implement API functions for a set of operations that may be performed on a firewall rule. These API functions may include functions such as HRESULT put_ApplicationName (BSTR imageFileName) and HRESULT get_ApplicationName (BSTR*imageFileName) to set the name of the application with which the firewall rule is associated and retrieve the name of an application with which a firewall rule is associated, respectively. As one example, these illustrative firewall API functions may accept as input a text string having an application name or a reference to a location in memory at which the name should be stored when retrieved, and may return an HRESULT object indicating either success or an error, although other suitable inputs and outputs are possible. For firewall rules that are to filter based on whether the sending or receiving process is in kernel mode, the text string accepted by the put_ApplicationName function, as above, may be "System" or any other suitable indicator.

It should be appreciated that embodiments of the invention are not limited to any particular process for creating security policies that filter communications based on in what operating mode a process is, and that embodiments of the invention may be used with any suitable process for creating such security policies.

Figure 4:
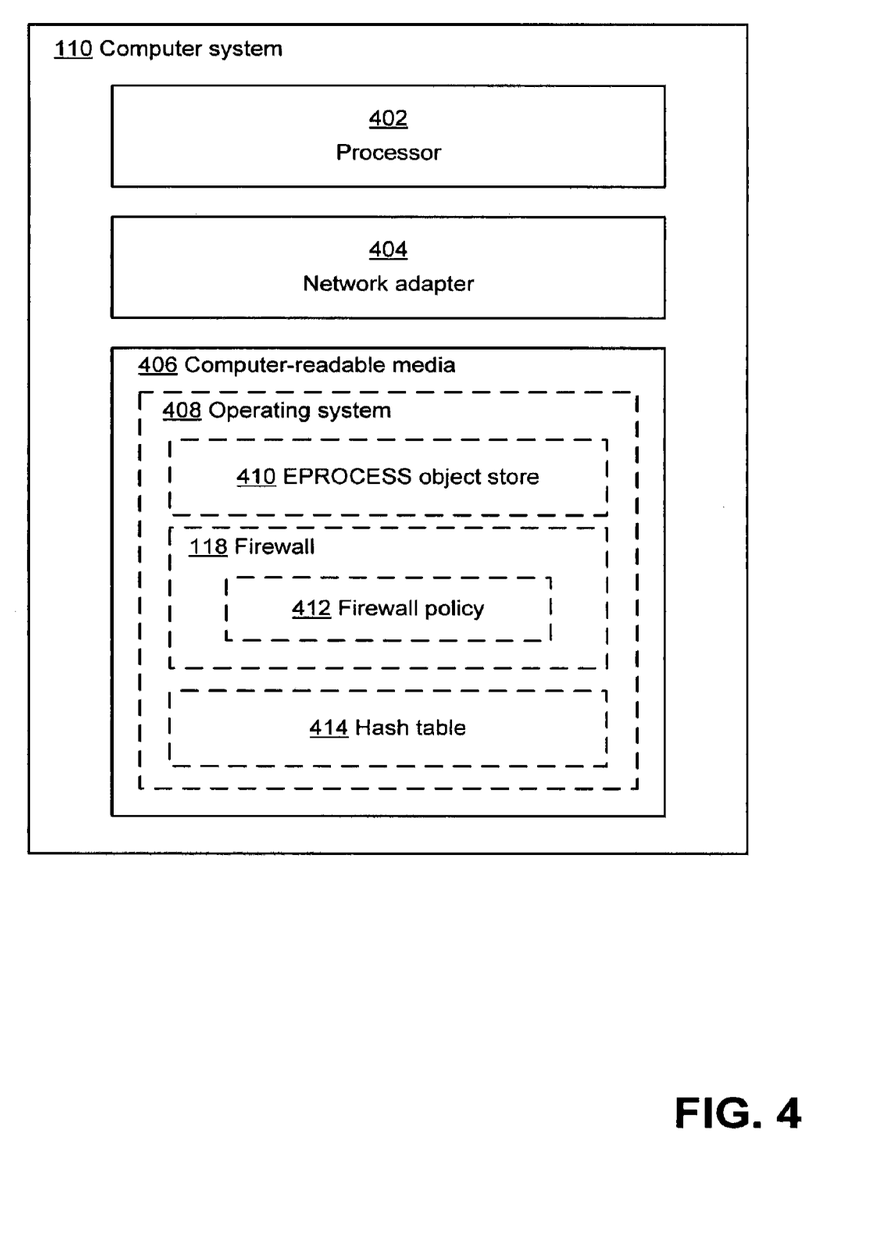
FIG. 4 is an exemplary computer system that may be used in accordance with one embodiment of the present invention.

The aspects of the present invention described herein may be implemented on any of numerous computer system configurations and are not limited to any particular type of configuration. FIGS. 4 and 5 show various computer systems in which embodiments of the invention may act, though others are possible.

FIG. 4 shows a computer system 110 one which aspects of one or more embodiments of the invention may be implemented. It should be appreciated that FIG. 4 is intended to be neither a depiction of necessary components for a computing device to operate as a computer apparatus with embodiments of the invention, nor a comprehensive depiction. As discussed above, any suitable computing device may be used as a computer system 110 (FIG. 1B) to determine whether a merged security policy permits a specific operation. A computer system may be a computing device designed for multiple purposes and for use by a user, such as a desktop personal computer, a laptop personal computer, a video game console, a server, a personal digital assistant (PDA), a smart/mobile telephone, or any other suitable electronic device. Alternatively, a computer system may be any computing device not intended for typical use by a user or intended for a single purpose or limited purposes, such as a server, a rack-mounted networking device, or a standalone networking device such as a switch, hub, router, access point, hardware firewall, or any other suitable electronic device.

As shown in FIG. 4, computer system 110 comprises a processor 402, a network adapter 404, and computer-readable media 406. Network adapter 404 may be any suitable hardware and/or software to enable computer system 110 to communicate with any other suitable computing device over any suitable computing network. The computing network may be any suitable wired and/or wireless communication medium or media for exchanging data between two or more computers, including the Internet. Computer-readable media 406 may be adapted to store data to be processed and/or instructions to be executed by processor 402. Processor 402 enables processing of data and execution of instructions. The data and instructions may be stored on the computer-readable media 406 and may, for example, enable communication between components of the computer system 110.

In accordance with some embodiments of the invention, the data and instructions stored on computer-readable media 406 may comprise an operating system (OS) 408. The OS 408 may be any suitable operating system, such as Microsoft Windows, the Apple Macintosh operating system available from Apple, Inc., of Cupertino, Calif., the UNIX operating system, the Berkley Software Distribution (BSD) operating system, the GNU/Linux operating system, or any other operating system. The OS 408 may then comprise a firewall 118 and a firewall policy store 410. The OS 408 may comprise an EPROCESS object store 410 to store EPROCESS objects, a firewall 118, and a hash table 414 for storing indications of which processes are in kernel mode or user mode.

The firewall 118 may further comprise a firewall policy store 412 for storing firewall rules and firewall settings.

While firewall 118 is shown in FIG. 4 as part of the OS 408, it should be appreciated that in some embodiments of the invention, the firewall 118 (comprising a firewall policy store 410) may be one or more standalone applications that interact with the operating system 408 and may not be a component of the operating system 408. It should be further appreciated that while FIG. 4 shows a computer system 110 implementing a firewall 118, embodiments of the invention may alternatively or additionally implement any other suitable security method such as a connection security engine.

It should be appreciated that in some embodiments of the invention, such as those wherein computer system 110 is implemented as a single purpose or limited purpose device, computer system 110 may not implement all features of the exemplary computer system 110 shown in FIG. 4. For example, in some embodiments of the invention, computer system 110 may not comprise an operating system 408. Rather, computer system 110 may be communicably linked to another computer system having an operating system, and adapted to communicate with that computer system to determine whether a process that is sending or receiving data, or attempting to send or receive data, is operating in kernel mode or user mode on that computer system.

Figure 5A:
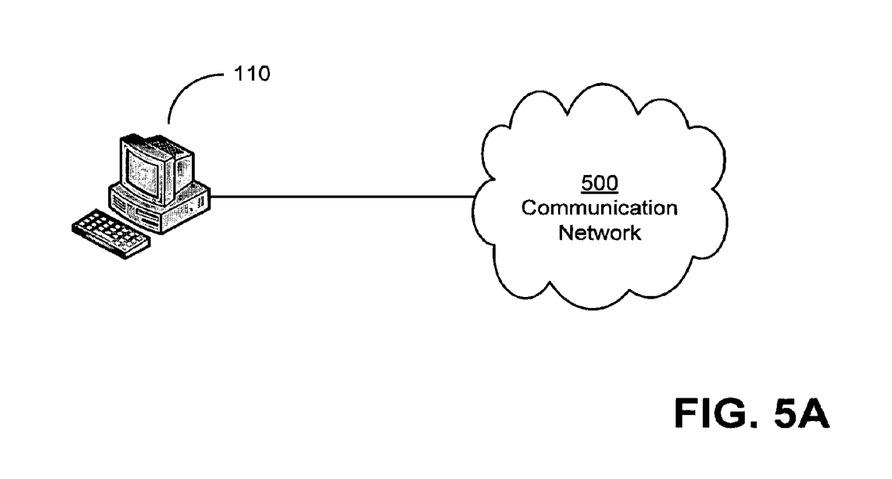
FIG. 5 is an exemplary computer network on which some embodiments of the invention may be implemented.

Computer system 110 may be disposed within and connected to a computer network. FIG. 5A shows one exemplary computer network in which embodiments of the invention may be implemented, though others are possible. In FIG. 5A, computer system 110 is connected to a computer network 500. As discussed above, computer network 500 may be any suitable wired and/or wireless communication medium or media for exchanging data between two or more computers, including the Internet. In the embodiment of FIG. 5A, a remote computer connected to computer network 500 may be communicating directly with computer system 110. Computer system 110 is, therefore, a terminal point of the connection, and firewall 118 may only be securing computer system 110 and not any other computing devices in the network. When data received from computer network 500 is received and approved by a firewall and/or any other security method, then, it may be provided directly to a process or application on computer system 110 and not relayed to another device over a network. Similarly, outbound data being sent from computer system 110 to a remote computer on computer network 500 through the firewall 118 may be received directly from a process or application and not over a network from another device.

It should be appreciated that although computer system 110 is shown in FIG. 5A as a desktop computer, the computer system may be implemented as any suitable computing device, including any of the exemplary computer systems discussed above.

Figure 5B:
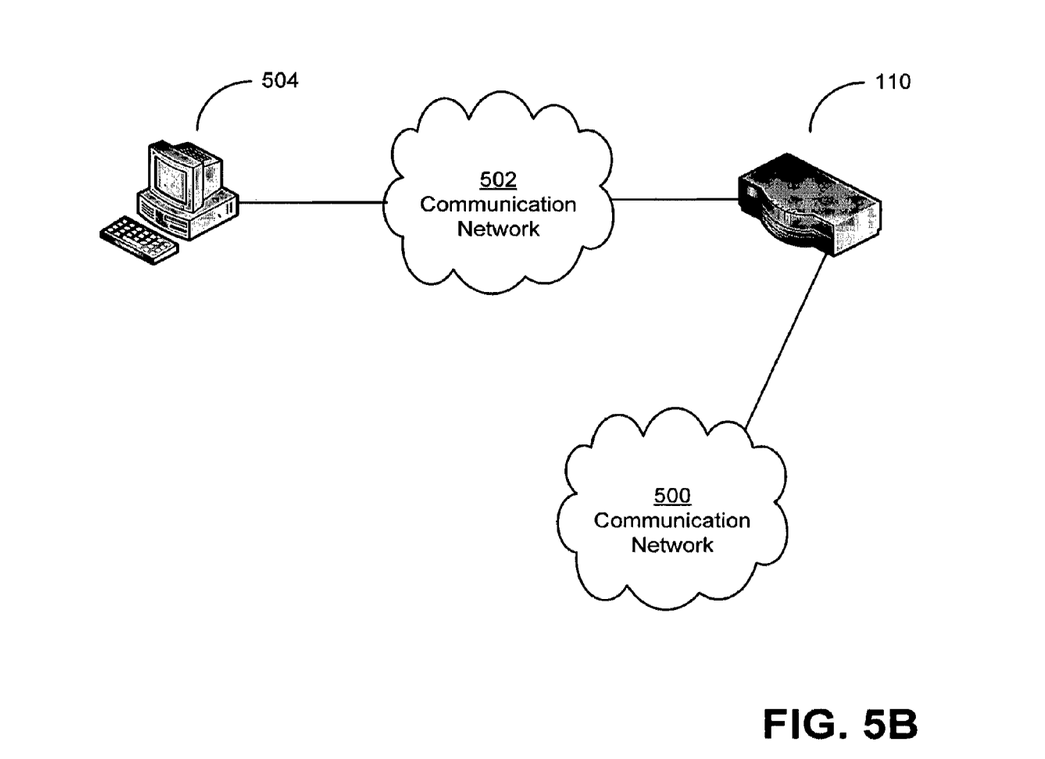

As an alternative to the embodiment shown in FIG. 5A, computer system 110, as discussed above, may be implemented as a single-purpose or limited-purpose device disposed within a computer network protecting multiple computers. Such an embodiment is shown in FIG. 5B. In FIG. 5B, computer system 110 is a stand-alone device such as a switch, hub, router, access point, hardware firewall, or other suitable electronic device. Computer system 110, as in FIG. 5A, may be connected to a computer network 100, but may also be connected to a computer network 502, which may be a local network. Just as computer network 500, computer network 502 may be any suitable wired and/or wireless communication medium or media for exchanging data between two or more computers, including the Internet. Computing device 504 may be connected to computer network 502, and may be being protected by firewall 106 on computer system 110. In this manner, for computing device 504 to send or receive data from certain computers, the data must be examined by firewall 118 on computer system 110 before it is relayed to either computing device 504, in the case of inbound data, or another computer in computer network 500, in the case of outbound data.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer system on which aspects of one or more embodiments of the invention may act may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer system on which aspects of one or more embodiments of the invention may act may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computer systems on which aspects of one or more embodiments of the invention may act may be interconnected by one or more computer networks in any suitable form, including as a local area network or a wide area network, such as an enterprise network or the Internet. Such computer networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, one or more embodiments of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. At least one computer-readable memory encoded with a plurality of instructions that when executed perform a method in a computer environment that comprises a computer network to which a computer system is coupled, the method comprising acts of:

(A) determining, for a process to which a network port of the computer system is assigned and that is attempting to send and/or receive data over the computer network via the network port, whether the process is executing in an operating system kernel mode of the computer system; and (B) notifying at least one security engine in the computer environment of the determination made in the act (A).

2. The at least one computer-readable memory of claim 1, wherein the act (A) comprises examining a hash table storing information for at least some processes executing on the computer system indicating whether each of the at least some processes is executing in the operating system's kernel mode.

3. The at least one computer-readable memory of claim 1, wherein the computer environment further comprises at least one second computer system coupled to the computer system via the computer network, and wherein the at least one security engine establishes at least one security policy performs at least one filtering function on at least one communication passing between the computer system and the at least one second computer system, and wherein the at least one security policy employs the at least one filtering function based on the notification of act (B).

4. The at least one computer-readable memory of claim 3, wherein the at least one security policy for the at least one security engine performs at least one filtering function based on a determination of whether the process is the source for the at least one communication and whether the process is a kernel mode process for the computer system.

5. The at least one computer-readable memory of claim 3, wherein the at least one security policy for the at least one security engine performs at least one filtering function based on a determination of whether the process is the destination for the at least one communication and whether the process is a kernel mode process for the computer system.

6. The at least one computer-readable memory of claim 3, wherein the at least one security engine is on the computer system.

7. The at least one computer-readable memory of claim 3, wherein the at least one security engine is on a different computer system in the computer environment than the computer system.

8. A method for use in a computer system operating in a computer environment that further comprises a computer network to which the computer system is coupled, the method comprising:
(A) determining, for a process that is attempting to send and/or receive at least one communication over the computer network via a network port of the computer system that has been assigned to the process by the computer system, whether the process is executing in an operating system kernel mode of the computer system;
(B) notifying at least one security engine in the computer environment of the determination made in the act (A); and
(C) allowing or disallowing the process to perform the send and/or receive based on a determination of the security engine.

9. The method of claim 8, wherein is the act (A) of determining is performed in response to detecting a socket operation performed by the process.

10. The method of claim 8, wherein the act (A) is performed in response to a receipt of the at least one communication by the computer system.

11. The method of claim 8, wherein the computer environment further comprises at least one second computer system coupled to the computer system via the computer network, and wherein the at least one security engine establishes at least one security policy performs at least one filtering function on at least one communication passing between the computer system and the at least one second computer system, and wherein the at least one security policy employs the at least one filtering function based on the notification of act (B).

12. The method of claim 11, wherein the at least one security engine is a firewall.

13. The method of claim 11, wherein the at least one security engine is on the computer system.

14. The method of claim 11, wherein the at least one security engine is on a different computer system in the computer environment than the at least one computer system.

15. A computer environment comprising:
at least one computer system comprising:
 at least one processor; and
 at least one computer-readable storage medium having encoded thereon processor-executable instructions that, when executed by the at least one processor, cause the at least one processor to act as:
 a first process to request that a network port of the at least one computer system be opened and to attempt to send and/or receive at least one communication over a computer network via the network port;
 a second process to determine whether the first process is executing in an operating system kernel mode of the at least one computer system; and
at least one security engine to establish at least one security policy that determines at least one filtering function that the at least one security engine performs on the at least one communication sent and/or received by the computer system, wherein the at least one security policy employs at least one filtering parameter that is based on a determination of whether, when the first process is attempting to send and/or receive a communication over the computer network via a network port, the first process is executing in an operating system kernel mode of the computer system.

16. The computer environment of claim 15, wherein the security policy is a firewall security policy.

17. The computer environment of claim 16, wherein the firewall security policy comprises at least one firewall rule comprising the at least one filtering parameter.

18. The computer environment of claim 15, wherein the at least one security engine is on the at least one computer system.

19. The computer environment of claim 15, wherein the at least one security engine is on a different computer system in the computer environment than the at least one computer system.

20. The method of claim 15, wherein determining whether the process is executing in an operating system kernel mode of the at least one computer system comprises examining a hash table storing information for at least some processes executing on the at least one computer system indicating whether each of the at least some processes is executing in the operating system's kernel mode.

\* \* \* \* \*